United States Patent
Hattori et al.

(10) Patent No.: US 7,202,849 B2
(45) Date of Patent: Apr. 10, 2007

(54) LIQUID CRYSTAL DISPLAY APPARATUS AND METHOD FOR DRIVING THE SAME

(75) Inventors: Katsuji Hattori, Takarazuka (JP); Shoichi Ishihara, Katano (JP); Tsuyoshi Uemura, Kadoma (JP); Kenji Nakao, Osaka (JP); Yoshinori Tanaka, Hirakata (JP); Keisuke Tsuda, Ishikawa-gun (JP); Yukio Numata, Kanazawa (JP); Mika Nakamura, Hirakata (JP); Junichi Kobayashi, Ishikawa-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 682 days.

(21) Appl. No.: 10/247,713

(22) Filed: Sep. 20, 2002

(65) Prior Publication Data

US 2003/0090442 A1  May 15, 2003

Related U.S. Application Data

(63) Continuation of application No. 09/745,415, filed on Dec. 26, 2000, now Pat. No. 6,476,792.

(30) Foreign Application Priority Data

Dec. 27, 1999 (JP) .............................. H11-369838
Feb. 10, 2000 (JP) ............................ 2000-0329098
Apr. 17, 2000 (JP) ............................ 2000-114869

(51) Int. Cl.
*G09G 3/36* (2006.01)

(52) U.S. Cl. ................................... 345/99; 345/94
(58) Field of Classification Search ................ 345/99, 345/102, 87, 94, 95
See application file for complete search history.

(56) References Cited

U.S. PATENT DOCUMENTS 3,666,947 A  5/1972  Haas et al.

(Continued)

FOREIGN PATENT DOCUMENTS

JP  3-103427  10/1991

(Continued)

OTHER PUBLICATIONS

Mori et al., "A wide-viewing-angle π cell compensated with a discotic film", The Institute of Electronics, Technical Report of IEICE, EID98-144, pp. 199-204.

*Primary Examiner*—Kent Chang
(74) *Attorney, Agent, or Firm*—Steptoe & Johnson LLP

(57) ABSTRACT

There are disclosed methods for driving liquid crystal display apparatuses for certainly completing in a short time to performing a transition of liquid crystal molecules to a displayable alignment in liquid crystal display apparatuses such that an initial alignment of the liquid crystal molecules is different from the displayable alignment, typically an optically compensated bend mode liquid crystal display apparatus. A voltage is applied to a liquid crystal layer until display area in the liquid crystal layer is transformed to the displayable alignment. After the completion of the transition, a backlight is switched on to sift to a display-driving mode. In order to complete the transition in a short time, voltage pulse under the conditions (such as a frequency and a voltage value) determined in accordance with a temperature of a liquid crystal panel is applied to the liquid crystal layer.

13 Claims, 6 Drawing Sheets

U.S. PATENT DOCUMENTS

| | | | |
|---|---|---|---|
| 3,666,948 A | 5/1972 | Mechlowitz et al. | |
| 5,592,193 A | 1/1997 | Chen | |
| 5,648,793 A | 7/1997 | Chen | |
| 5,668,651 A | 9/1997 | Yamada et al. | |
| 5,754,154 A * | 5/1998 | Katakura et al. | 345/97 |
| 5,912,651 A | 6/1999 | Bitzakidis et al. | |
| 6,005,646 A | 12/1999 | Nakamura et al. | |
| 6,069,620 A | 5/2000 | Nakamura et al. | |
| 6,115,021 A * | 9/2000 | Nonomura et al. | 345/101 |
| 6,965,367 B2 * | 11/2005 | Tanaka et al. | 345/102 |

FOREIGN PATENT DOCUMENTS

| | | |
|---|---|---|
| JP | 5-264956 | 10/1993 |
| JP | 7-5427 | 1/1995 |
| JP | 7-84254 | 3/1995 |
| JP | 9-185037 | 7/1997 |
| WO | WO99/53366 | 10/1999 |

* cited by examiner

LIQUID CRYSTAL DISPLAY APPARATUS AND METHOD FOR DRIVING THE SAME

This is a Continuation of application Ser. No. 09/745,415 filed Dec. 26, 2000 now U.S. Pat. No. 6,476,792.

BACKGROUND OF THE INVENTION

The present invention relates to liquid crystal display apparatuses which require a transition of liquid crystal molecules in a liquid crystal layer from an initial alignment to a predetermined displayable alignment in advance of displaying. More particularly, this invention relates to an improvement in methods of driving such apparatuses with the transition of the alignment of liquid crystal molecules.

Various kinds of liquid crystal display apparatuses have conventionally been proposed and practicalized. In recent years, liquid crystal televisions have been expected to spread.

Widely used twisted nematic mode liquid crystal display apparatuses which employ nematic liquid crystals have shortcomings such as a slow response and a narrow viewing angle.

In-plane switching mode liquid crystal display apparatuses having a wide viewing angle have shortcomings in response speed and aperture ratio. Ferroelectric liquid crystal mode liquid crystal display apparatuses hereinafter referred to as "FLC type liquid crystal display apparatuses") exhibit a quick response and have a wide viewing angle, but also have great shortcomings in shock resistance, temperature property and the like.

In contrast, optically compensated bend mode (or optically compensated birefringence mode) liquid crystal display apparatuses (hereinafter, referred to as "OCB mode liquid crystal display apparatuses"), which were proposed in Japanese Unexamined Patent Publications No. Hei 7-84254 or Shingaku Technical Reports (EDI98–144, on page 19, published by the Corporation of Electricity Communication Institute) exhibit a quick response and have a wide viewing angle. The apparatuses, therefore, will be expected to be applied to liquid crystal televisions and the like as transmission or reflection type liquid crystal display apparatuses hereafter.

FIG. 7a shows an example of OCB mode liquid crystal display apparatuses. A liquid crystal panel 2 includes an array substrate 3a with transparent pixel electrodes 4a provided thereon, a counter substrate 3b with transparent counter electrodes 4b provided thereon and a liquid crystal layer 7 sandwiched between the array substrate 3a and the counter substrate 3b. Liquid crystal alignment layers 6a and 6b of polyimide are formed on internal surfaces of the array substrate 3a and the counter substrate 3b, on which the pixel electrodes 4a and the counter electrodes 4b are provided, respectively. Both the liquid crystal alignment layers 6a and 6b had been treated with rubbing, and the substrates 3a and 3b are disposed so that the rubbing directions of the liquid crystal alignment layers 6a and 6b are parallel to each other. The liquid crystal layer 7 is filled with a nematic liquid crystal material having a positive dielectric anisotropy.

When a voltage is not applied between the pixel electrode 4a and the counter electrode 4b, pretilt angles of liquid crystal molecules 7a on both of the array substrate 3a and the counter substrate 3b are approximately several to 10 degrees in reverse directions. As shown in FIG. 7a, the liquid crystal molecules 7a offers an alignment such as to be inclined symmetrically and outwardly on a plane or a spray alignment.

In a case of an OCB mode liquid crystal display apparatus, by applying a voltage pulse (hereinafter, referred to as "a voltage pulse for transition") with a comparatively high voltage between the pixel electrode 4a and the counter electrode 4b in a short time when a main power is switched on, for example, the liquid crystal molecules 7a having a spray alignment as shown in FIG. 7a locally rise and a micro area of bend alignment or bend alignment including twisted alignment (hereinafter, referred to as a "transition core") is generated as shown in FIG. 7b. The transition core is spread by repeatedly applying the voltage pulse for transition. The transition of the whole liquid crystal material in the liquid crystal layer 7 to bend alignment enables an OCB mode liquid crystal display apparatus to display. An OCB mode liquid crystal display apparatus can display by utilizing a change in retardation resulting from a change in bend alignment of the liquid crystal molecule 7a, which is caused by applying display signal driving voltage.

On the external surface of the liquid crystal panel 2, there is disposed a phase-compensation plate 8 for optically compensating in order to enable a low voltage driving of the liquid crystal panel 2 as well as widen a viewing angle, with an optical axis thereof being fixed in a predetermined direction.

In a case of an OCB mode liquid crystal display apparatus, an inducement of such initially transition from spray alignment to bend alignment and a completion of the transition in the whole pixel area of the liquid crystal panel 2 in a short time are required before turning into an ordinary display-driving mode, as described above.

An FLC type liquid crystal display apparatus and a phase transition type liquid crystal display apparatus involve similar requirements before being shifted to an ordinary display-driving mode.

These liquid crystal display apparatuses have the following problems.

If the transition of the liquid crystal molecules to a displayable alignment is not carried out sufficiently, a fine display can not obtained when shifted to a display-driving mode. For example, in an OCB mode liquid crystal display apparatus, when the transition to bend alignment is not completed and an area of spray alignment remains locally, the remaining area becomes a bright point in display driving and looks like a point defect. The image is displayed dimly and unstably for several seconds to several minutes after starting display driving. Consequently, the transition to bend alignment must be certainly completed before being shifted to the display-driving mode. The transition core, however, is accidentally generated or not generated in the same place even if the voltage pulse for transition is applied on the same conditions, leading to the difficulty in certainly completing the transition in a short time.

Generally, a backlight is turned on when a main power of the apparatus is switched on. In liquid crystal televisions, an output of voice from a speaker starts simultaneously. However, in liquid crystal display apparatuses for carrying out the transition of the alignment of liquid crystal molecules in the liquid crystal layer to a predetermined alignment in advance of displaying, it occasionally takes a long time to be shifted to the ordinary display-driving mode. It is a waste of energy to switch on the backlight for the shift period to the display-driving mode or the transition period. The display having many point alignment defects and plane alignment defects due to pixels with no transition or under transition as well as the blinking of the whole screen due to the application of the voltage pulse for transition are the causes of users' discomfort and anxiety. Disappearance of the above-mentioned defects due to alignment transition can delete such sense of incongruity thereby realizing liquid crystal display apparatuses which can display images with high quality and are excellent in commercial view.

Operations of liquid crystal display apparatuses must be assured in a wide temperature range for being applied to various uses. Further, in an OCB mode liquid crystal display apparatus, the transition to bend alignment must be certainly completed in a short time in such wide temperature range for assuring the operations.

In a 10-inch model active matrix type liquid crystal display apparatus, for example, the transition can be completed in a short time of 0.5 to 1 second at room temperatures of around 25° C., while it occasionally takes along time, several minutes depending on conditions, for the whole liquid crystal layer to carry the transition to bend alignment at a low temperature in a range of −10 to 0° C. That is, the OCB mode liquid crystal display apparatus is required to certainly complete the transition for displaying in a short time, several seconds at the longest in a wide temperature range as in a case of a general display apparatus.

SUMMARY OF THE INVENTION

The object of the present invention is to solve the above-mentioned problems thereby to provide methods of driving liquid crystal display apparatuses of which an initial alignment of liquid crystal molecules is different from the displayable alignment such as an OCB mode liquid crystal display apparatus, enabling a certainly completion of a transition of the liquid crystal molecules to the displayable alignment in a short time.

A method for driving a liquid crystal display apparatus in the present invention is a method for driving a liquid crystal display apparatus having a liquid crystal panel including a pair of substrates, a liquid crystal layer sandwiched between the pair of substrates, and a voltage-application unit for applying a voltage to the liquid crystal layer, in which an initial alignment of a liquid crystal material in the liquid crystal layer is different from a displayable alignment. In this method, the voltage for performing a transition of a liquid crystal material in a display area of the liquid crystal layer from the initial alignment to the displayable alignment is applied to the liquid crystal layer, in advance of displaying the liquid crystal panel, until the transition being carried out.

Preferably, a completion of the transition is determined after a product of a growth rate of an area of the liquid crystal layer being carried out the transition to the displayable alignment by a time for applying the voltage becomes more than an area of a display area of the liquid crystal panel. For example, the completion of the transition is determined when a product of a growth rate of an area of the liquid crystal layer being carried out the transition to the displayable alignment by a time for applying the voltage becomes larger than a predetermined value in a range of an area of a display area to twice the area of that.

Since a progression rate of the transition varies with a temperature, a time for applying the voltage for the transition is preferably set on the basis of a temperature of the liquid crystal panel measured in advance of applying the voltage for the transition, leading to the prevention of excess or insufficiency in applying voltage. If the voltage is applied to the liquid crystal layer for a time required for carrying out the transition of the liquid crystal layer in the display area to the displayable alignment at a predetermined lowest temperature in an operable temperature range, the transition is certainly completed in the whole operable temperature range.

In order to performing the transition of the liquid crystal layer in a display area, for example, after making a micro area of the liquid crystal layer being carried out the transition to the displayable alignment generates at each pixel or each area including a predetermined number of pixels, then the micro area is spread.

The micro area can be generated at a projection formed on a surface of the voltage-application unit or around a specific area on a liquid crystal alignment layer such that a pretilt angle of a liquid crystal material thereon is different from that of a liquid crystal material on another area.

In the case of forming the micro area at each pixel, a completion of the transition can be determined after a product of a growth rate of the micro area by a time for applying the voltage for the transition becomes larger than an area of the pixel. In the case of forming the micro per plural pixels, the completion of the transition can be determined similarly by comparing a product of a growth rate of the micro area by a time for applying the voltage with an area of pixels corresponding to the micro area.

The voltage for the transition is intermittently or continuously applied to the liquid crystal layer.

In the case of a transmission-type liquid crystal display apparatus including a backlight, it is preferable that the backlight is switched on after the completion of the application of the voltage to the liquid crystal layer.

This method for driving this liquid crystal display apparatus is useful for an OCB mode liquid crystal display apparatus in which the displayable alignment is a bend alignment, and the liquid crystal layer is carried out a transition from a spray alignment to the bend alignment in advance of displaying.

A liquid crystal display apparatus in the present invention has a liquid crystal panel with a plurality of pixels, the liquid crystal panel including: a pair of substrates with a rubbing-treated liquid crystal alignment formed thereon which are disposed so that the liquid crystal alignment layers face to each other and rubbing directions thereof are the same; a liquid crystal layer sandwiched between the pair of substrates; and a voltage-application unit for applying a voltage to the liquid crystal layer, wherein a length of the pixel in the rubbing direction is longer than a length of the pixel in a vertical direction to the rubbing direction.

The growth rate of the micro area in a rubbing direction is faster than that in a vertical direction to the rubbing direction. Accordingly, the parallelyzation of a longitudinal direction of the substrate with the rubbing direction can greatly shorten the time for transforming. A length of the pixel in the rubbing direction is longer than that of the pixel in a vertical direction to the rubbing direction, similarly leading to greatly shortening the tune for transforming.

Another method for driving a liquid crystal display apparatus in the present invention is a method for driving a liquid crystal display apparatus having: a liquid crystal panel including a pair of substrates, a liquid crystal layer sandwiched between the pair of substrates, and a voltage-application unit for applying a voltage to the liquid crystal layer; and a backlight for projecting lights to the liquid crystal panel to display the liquid crystal panel, wherein an initial alignment of the liquid crystal layer is different from a displayable alignment. The method including a step of performing a transition of the liquid crystal layer to the displayable alignment by applying a voltage to the liquid crystal layer, and another step of switching on the backlight after a completion of applying the voltage for the transition of the liquid crystal layer.

In the case of a liquid crystal television, it is preferable that an application of the voltage to the liquid crystal layer and an output of a voice for broadcasting are started when a main power is switched on, and a display of images starts after completing the transition.

For example, the backlight is switched on only during an ordinary display-driving or displaying images.

This method for driving is particularly useful for an OCB mode liquid crystal display apparatus in which the liquid crystal layer is carried out a transition from a spray alignment as the initial alignment to a bend alignment as the displayable alignment in advance of displaying the liquid crystal panel.

This method for driving is used for a liquid crystal display apparatus having an active matrix type liquid crystal panel which includes a switching element at each pixel.

It is preferable that a completion of the transition is determined so that an application of the voltage is finished and the backlight is switched on when a predetermined time passes after starting to apply the voltage for the transition of the liquid crystal layer.

In order to performing the transition of the liquid crystal layer to a predetermined displayable alignment in a short time, it is preferable to apply a higher voltage than a voltage of a voltage signal for displaying the liquid crystal panel. The transition, however, can also be progressed by applying a voltage equal to a voltage of a voltage signal for displaying. That is, a power supply system does not have to be prepared for each of transition-driving and display-driving, but an output voltage signal from a power supply system for display-driving can also be employed for a voltage signal for transforming.

In liquid crystal display apparatuses having a cover of the liquid crystal panel to be opened for use, such as a notebook type personal computer, a mobile computer and a folding portable phone, it is preferable to detect a progressional state of the transition in advance of switching on the backlight, being synchronized with an opening of the cover. That is, when the cover is opened, a judgement is done on whether the transition has been completed. If the transition has been completed, then the backlight is switched on, meanwhile. If not, the backlight is switched on after carrying out the transition.

An application of the voltage for the transition of the liquid crystal layer may be started, being synchronized with an opening of the cover.

It is preferable that the backlight is switched off, being synchronized with a closing of the cover, so that a voltage is applied to the liquid crystal layer for maintaining the displayable alignment of the liquid crystal layer. It is also preferable that the backlight is switched on, being synchronized with an opening of the cover, so that the application of the voltage is finished.

It is also preferable to switch off the backlight so that a voltage is applied to the liquid crystal layer for maintaining the displayable alignment of the liquid crystal layer when an input signal from a user is not recognized for a predetermined time during a display driving. In such case, the application of the voltage is finished so that the backlight is switched on when an input signal from the user is recognized during the application of the voltage.

Preferably, a progressional state or a completion of the transition of the liquid crystal material is notified to a user.

For example, it is notified to a user by a sound signal such as a voice from a speaker and by an optical signal or a display from a lamp, a light-emitting diode and an electroluminescence element. In the case of a liquid crystal television, it is preferable that an application of the voltage to the liquid crystal layer and an output of a voice for broadcasting by a speaker are started when a main power is switched on; and a voice signal for notifying a progressional state of the transition is superposed on a voice signal for broadcasting.

Another liquid crystal display apparatus in the present invention has a liquid crystal panel including a liquid crystal layer of which initial alignment is different from a displayable alignment, a pair of substrates sandwiching the liquid crystal layer therebetween, and a voltage-application unit to the liquid crystal layer; a backlight for projecting lights to the liquid crystal panel to display the liquid crystal panel; a transition-driving unit for driving the voltage-application unit to apply a voltage to the liquid crystal layer thereby to performing a transition of the liquid crystal layer to the displayable alignment and for determining a completion of the transition of the liquid crystal layer; and a backlight-driving unit for switching on the backlight after the completion of the transition.

This liquid crystal display apparatus is useful for an OCB mode liquid crystal display apparatus in which the displayable alignment is a bend alignment; and the liquid crystal layer is carried out a transition from a spray alignment to the bend alignment in advance of displaying. Further, this liquid crystal display apparatus is also useful for a liquid crystal display apparatus having an active matrix type liquid crystal panel including a switching element at each pixel.

Preferably, a liquid crystal display apparatus further includes a switch for forcedly starting to apply a voltage by the voltage-application unit to performing a transition of the liquid crystal layer. When display defect resulting from transition defect is recognized in the liquid crystal panel, the transition is made on the liquid crystal layer again by the switch, leading to no display defect.

A further method for driving a liquid crystal display apparatus in the present invention is a method especially useful for driving an OCB mode liquid crystal display apparatus which has a liquid crystal panel including a pair of substrates, a liquid crystal layer held between the substrates, and a voltage-application unit to the liquid crystal layer, and the method including, in advance of displaying images, a step of: measuring a temperature of the liquid crystal panel; another step of determining a condition of a voltage pulse for performing the transition of the liquid crystal layer to a bend alignment on the basis of the measured temperature; and a further step of applying the voltage pulse to the liquid crystal layer according to the determined condition.

In a preferred mode of the present invention, a frequency of the voltage pulse is determined on the basis of the measured temperature in the step of determining a condition of the voltage pulse. In such case, preferably, a frequency of the voltage pulse is set to be higher at a high temperature than at a low temperature. For example, a frequency of the voltage pulse is set to be 2 to 5 Hz at the temperature of 20° C. or more; and a frequency of the voltage pulse is set to be 0.2 to 1 Hz at the temperature of 0° C. or less. More preferably, a frequency of the voltage pulse is set to be in a range of 2.5 to 4 Hz at the temperature of 20° C. or more; and a frequency of the voltage pulse is set to be in a range of 0.4 to 0.6 Hz at the temperature of 0° C. or less.

In another preferred mode of the present invention, a voltage value of the voltage pulse is determined on the basis of the measured temperature in the step of determining a condition of the voltage pulse. In this case, preferably, a voltage value of the voltage pulse is set to be higher at a low temperature than at a high temperature.

In a further preferred mode of the present invention, a frequency and a voltage value of the voltage pulse are determined on the basis of the measured temperature in the step of determining a condition of the voltage pulse.

In a still further preferred mode of the present invention, a pulsewidth of the voltage pulse is determined on the basis of the measured temperature in the step of determining a condition of the voltage pulse.

A condition of the voltage pulse varies continuously in accordance with a temperature of the liquid crystal panel.

The condition of the voltage pulse may vary gradually. For example, the condition of the voltage pulse to be determined is set for each predetermined divided temperature range in the step of determining the condition of the voltage pulse. An operable temperature range is divided into the two temperature ranges such as high temperature and low temperature, for example.

If an initial period such that a voltage applied to the liquid crystal layer is approximately 0 V is set immediately before applying the voltage pulse in the step of applying the voltage pulse, the transition can be completed in a short time. The initial period is set to be, preferably, 0.2 to 5 seconds. In the case of intermittently applying a plurality of the voltage pulses, it is effective to set a period such that an electric potential between the pair of electrodes as the voltage-application unit is approximately 0 V in an interval between the voltage pulses.

The voltage pulse is simultaneously applied at all pixels, resulting in the completion of the transition in a short time.

In the case of a transmission type liquid crystal display apparatus having a backlight, it is preferable that the backlight is switched on after the transition of the liquid crystal layer to a bend alignment by applying the voltage pulse.

This method is used for an active matrix type liquid crystal display apparatus comprising a switching element at each pixel for example.

A still further method for driving a liquid crystal display apparatus in the present invention is a method especially useful for driving an OCB mode liquid crystal display apparatus, and, in advance of displaying an image, the voltage pulse is applied to the liquid crystal layer, in the whole operable temperature range, according to a condition of a voltage pulse to be applied to the liquid crystal layer for carrying out the transition of the liquid crystal layer to a bend alignment in a short time at a lowest operable temperature. That is, the voltage pulse is applied to the liquid crystal layer in the whole operable temperature range according to a condition of a voltage pulse at a temperature at which the voltage pulse should be applied for a longer time. Thus, the transition can be completed in a comparatively short time at any operable temperature. For example, it is preferable to apply the voltage pulse having a frequency selected from a range of 0.2 to 1 Hz more preferably, 0.4 to 0.6 Hz.

A further liquid crystal display apparatus in the present invention has a liquid crystal panel including a pair of substrates, a liquid crystal layer held between the substrates, and a voltage-application unit for applying a voltage to the liquid crystal layer; a temperature-detecting unit for detecting a temperature of the liquid crystal panel; and a condition-determining unit for determining a condition of a voltage pulse to be applied by the voltage-application unit for performing the transition of the liquid crystal layer to a bend alignment on the basis of a temperature of the liquid crystal panel detected by the means of detecting a temperature of the liquid crystal panel.

The present invention is especially useful for so called OCB mode liquid crystal display apparatus.

In the present invention, the phrase "turning on the backlight" means making the backlight emit light for displaying images. On the other hand, the phrase "turning off the backlight" includes reducing an intensity of the light so as to disable the backlight for displaying images even when the backlight maintains an electrical connection besides a general OFF state.

DESCRIPTION OF THE PREFERRED EMBODIMENTS

Figure 1A:
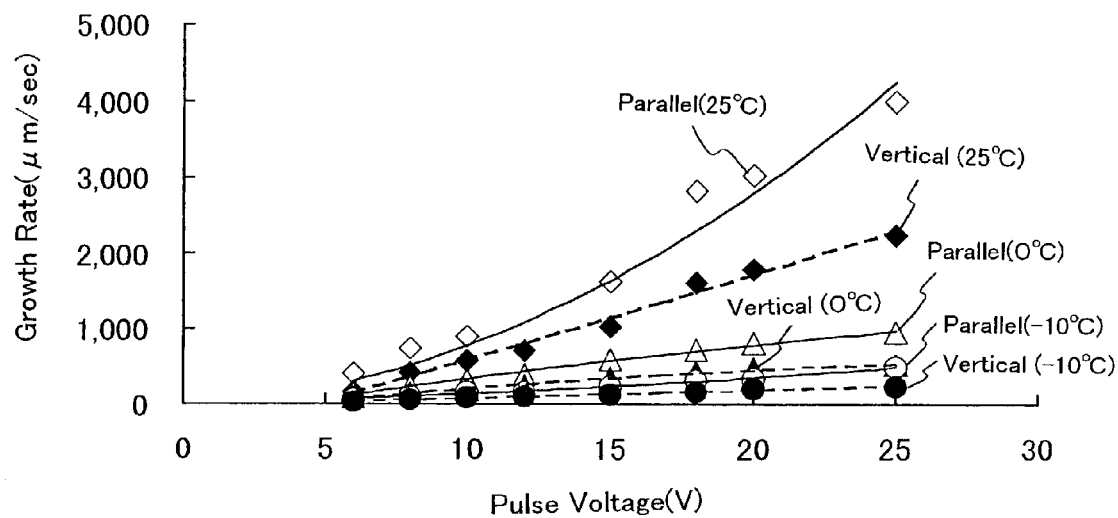
FIG. 1a is a characteristic diagram showing a relation between a rubbing direction of liquid crystal alignment layer and a growth rate of bend alignment phase.

Hereafter, the preferable embodiments of the present invention are detailed below referring to the drawings.

OCB mode liquid crystal display apparatuses are described as examples in the following embodiments.

Embodiment 1

A method for certainly carrying out a transition of a liquid crystal layer from an initial alignment to a displayable alignment, in advance of displaying a panel is detailed referring to the drawings in the present embodiment.

Figure 7A:
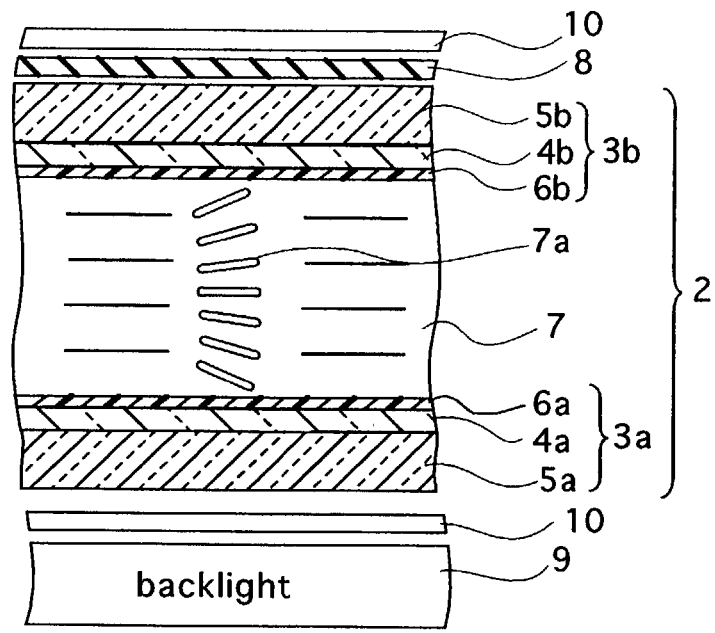
FIG. 7a and FIG. 7b are longitudinal cross sectional views schematically showing a structure of an OCB mode liquid crystal display apparatus.
Figure 7B:
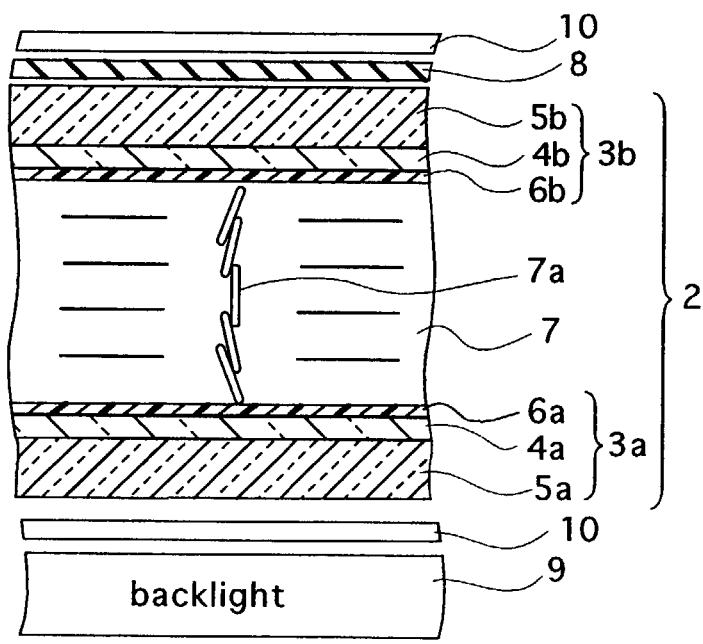

In an OCB mode liquid crystal display apparatus as shown in FIG. 7a and FIG. 7b, a pair of substrates 3a and 3b are basically disposed so that rubbing directions of the liquid crystal alignment layers 6a and 6b formed on surfaces contacting the liquid crystal layer 7 are parallel to each other.

In an initial state where a voltage is not applied between the pixel electrode 4a and the counter electrode 4b, the liquid crystal molecules 7a in the liquid crystal layer 7 are arrayed approximately in parallel, namely, spray alignment as shown in FIG. 7a. The transition from the spray alignment to bend alignment as shown in FIG. 7b is required for displaying a panel. A comparatively higher voltage than driving signal for displaying, such as 25 V, has conventionally been applied between both of the electrodes for the transition.

While applying a voltage pulse for performing the transition (hereinafter, referred to as "voltage pulse for transition"), an ordinary display can not be performed. It, therefore, is desirable to shorten the transition period in consideration of users' convenience.

An application of the voltage pulse for transition locally generates micro areas of bend alignment (hereinafter, referred to as "transition cores"), thereafter the transition core is gradually growing. If the transition core generates in a pixel, the transition to bend alignment is started therefrom. For example, a forming portion of the transition core is provided in auxiliary capacity provided near a gate line in a pixel. It is possible to generate the transition core in a desirable place by providing a projection at an electrode or by providing on a liquid crystal alignment layer an area such that a pretilt angle of a liquid crystal molecule thereon is different from that of a liquid crystal molecule on another area, for example.

After an area of bend alignment is spread on the whole pixel area, the application of the voltage pulse for transition is stopped and the driving signal for displaying is transmitted, leading to a fine display. It is required for transforming sufficiently to apply the voltage pulse for transition until the product of the growth rate of the area of bend alignment by the application time becomes the whole pixel area or more.

Figure 1B:
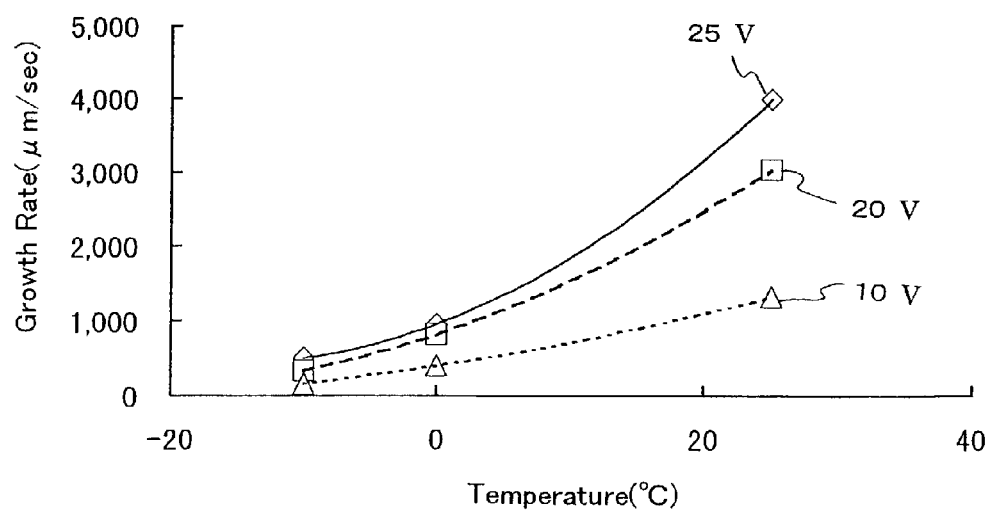
FIG. 1b is a characteristic diagram showing a relation between an applied voltage and the growth rate.

FIG. 1a, FIG. 1b and Table 1 are showing the growth rates of the areas of bend alignment.

TABLE 1

| Voltage Pulse for Transition (V) | 6 | 8 | 10 | 12 | 15 | 18 | 20 | 25 |
|---|---|---|---|---|---|---|---|---|
| Room Temp. | | | | | | | | |
| Rubbing Direction | 415 | 750 | 910 | 1,320 | 1,636 | 2,829 | 3,039 | 4,000 |
| Vertical Direction | 162 | 427 | 585 | 720 | 1,034 | 1,618 | 1,798 | 2,247 |
| 0° C. | | | | | | | | |
| Rubbing Direction | 145 | 236 | 327 | 400 | 591 | 727 | 818 | 955 |
| Vertical Direction | 87 | 140 | 191 | 243 | 348 | 435 | 478 | 522 |
| −10° C. | | | | | | | | |
| Rubbing Direction | 64 | 109 | 164 | 164 | 236 | 318 | 333 | 500 |
| Vertical Direction | 35 | 61 | 87 | 96 | 130 | 163 | 202 | 240 |
| | | | | | | | | (μm/sec) |

As clarified in FIG. 1a, FIG. 1b and Table 1, the growth rate of the transformed area of bend alignment depends on each of temperature and applied voltage. The growth rate in the rubbing direction of the liquid crystal alignment layer is faster than that in a vertical direction to the rubbing direction. Accordingly, the area of bend alignment can be formed in a short time by equalizing a longitudinal direction of a rectangular pixel to the rubbing direction.

Actually, in a liquid crystal panel such that the longitudinal direction of the pixel is equalized to the rubbing direction, the voltage application time of 0.04 sec and 0.12 sec were sufficient for a liquid crystal panel having a pixel area of 160 μm×50 μm and having that of 450 μm×150 μm, respectively, at a room temperature of 25° C. where a growth rate is 4,000 μm/sec.

The growth rate, however, varies with temperature as described above. If the application time of the voltage pulse for transition to bend alignment is excessive, a normal display can not be performed for the excessive time resulting in a waste of time to users. On the other hand, if the transition to bend alignment is insufficient, a normal display can not occasionally be performed. A temperature sensor, therefore, is installed in a liquid crystal panel so that the time for applying voltage is determined on the basis of the measured panel temperature. This method makes it possible to set as much time as is necessary for the transition and to prevent excess and insufficiency in the transition.

The above-mentioned control of the transition by the temperature costs additionally due to the temperature sensor and control means thereof. In view of preventing insufficiency of the transition, previous setting of the necessary conditions required for the transition to bend alignment at the lowest temperature in a temperature range for assuring the operations of an apparatus, where the growth rate of the transition core is the slowest, leads an assurance of sufficient transition without installing the temperature sensor and no additional costs such as the temperature sensor. For example, the voltage application time of 0.16 second or more was sufficient for a liquid crystal panel having a pixel area of 160 μm×50 μm, and that of 0.45 second or more was sufficient for a pixel area of 450 μm×150 μm at the lowest temperature for assuring the operations (0° C.) where a growth rate is 1,000 μm/sec.

The voltage pulse for transition is applied intermittently or continuously. The sum of the application time corresponds to $T_1$ shown in FIG. 2 in the case of applying intermittently.

It was experientially sufficient to set twice as long the voltage application time as a value calculated on the basis of the growth rate including a margin despite a time lag from the start of the voltage application to an occurrence of the transition core of bend alignment.

Figure 2:
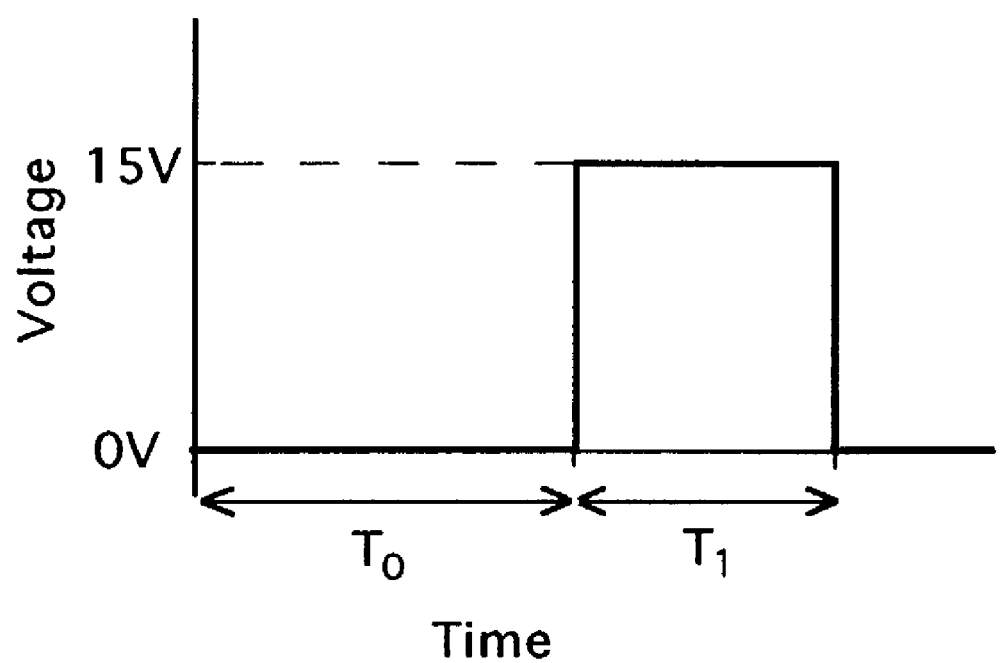
FIG. 2 is a characteristic diagram showing a waveform of a voltage pulse for a transition.

In the present embodiment, a pause period $T_0$ representing the applied voltage of 0 V was set before the voltage application time represented by $T_1$ in FIG. 2. The pause period $T_0$ enables the transition core to be generated stably and the transition to be progressed stably. The transition can be progressed more stably with the longer pause period. Actually, the pause period of approximately 0.2 second enables a stable transition.

Embodiment 2

There is described an improvement in decreasing unnecessary power consumption and in not giving users' discomfort and anxiety in this embodiment.

Figure 3:
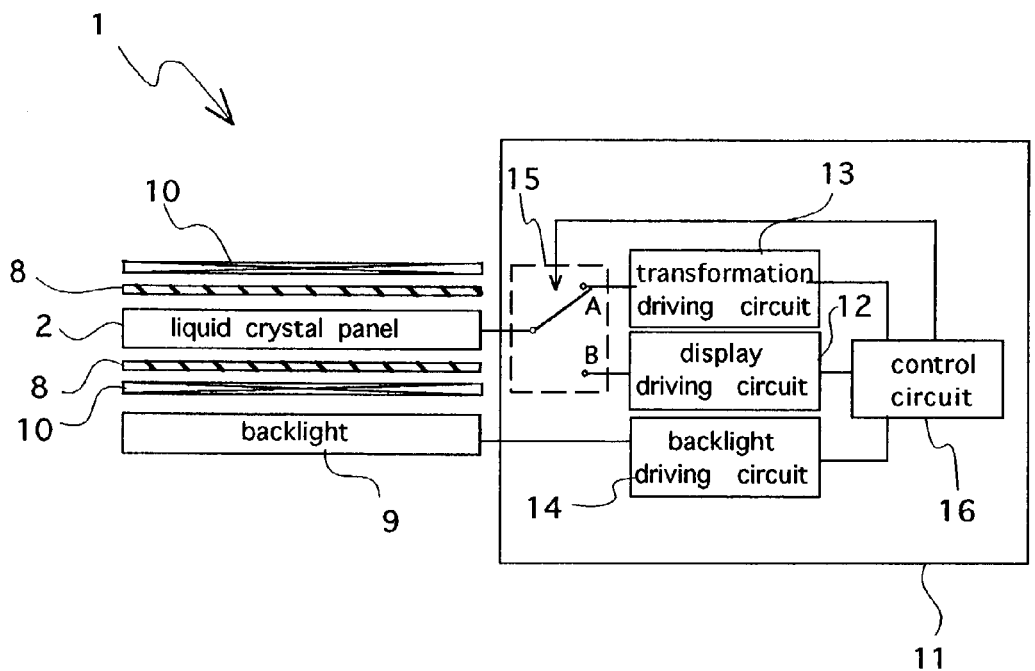
FIG. 3 is a schematic view showing a structure of liquid crystal display apparatus in an embodiment of the present invention.

FIG. 3 shows a schematic constitution of a liquid crystal display apparatus in this embodiment. The liquid crystal display apparatus is an OCB mode liquid crystal display apparatus.

A liquid crystal display apparatus 1 includes a 7-inch model active matrix type liquid crystal panel 2, a pair of film-shaped retardation plates 8 for optically compensating in order to enable a low voltage driving as well as widen a viewing angle, a pair of polarizers 10 and a backlight 9 for projecting lights to the liquid crystal panel 2. The liquid crystal panel 2 has the same structure as that shown in FIG. 7a.

A control unit 11 includes a display-driving circuit 12 for outputting a driving signal for displaying in display driving, a transition-driving circuit 13 for outputting a voltage pulse for performing the transition of a liquid crystal layer to bend alignment, a backlight-driving circuit 14 for ON/OFF-controlling the backlight 9 and a control circuit 16 for controlling these circuits.

The transition-driving circuit 13 intermittently applies a voltage pulse with a high voltage such as 15 V for performing a liquid crystal layer 7 from spray alignment to bend alignment between the pixel electrode 4a and the counter electrode 4b of the same liquid crystal panel 2 as shown in FIG. 7a for a certain time.

This liquid crystal display apparatus requires 2 seconds of the voltage pulse application in order to transform the liquid crystal layer 7 in all pixels of the liquid crystal panel 2 from spray alignment to bend alignment at room temperature.

When a main power of the liquid crystal display apparatus 1 is switched on, the control circuit 16 connects a switch 15 to a terminal "A" and the transition-driving circuit 13 applies the high voltage pulse for transition to the liquid crystal panel 2 for 2 seconds. The application of the voltage pulse for transition can carry out a transition of the liquid crystal molecule 7a in the liquid crystal layer 7 from spray alignment to bend alignment.

When the application of the voltage pulse for transition is finished, the control circuit 16 connects the switch 15 to a terminal "B" and connects the display-driving circuit 12 with the liquid crystal panel 2. The control circuit 16 is synchronized with the connection between the display-driving circuit 12 and the liquid crystal panel 2 to operate the backlight-driving circuit 14 and switch on the backlight 9. Thus, the liquid crystal display apparatus 1 is shifted to a display-driving mode.

The liquid crystal display apparatus 1 in this embodiment does not offer a defective display such that the screen blinks intermittently, and point defect and plane defect appear on the whole surface of a liquid crystal panel during the transition as in conventional liquid crystal display in which the voltage pulse for transition is applied after switching on a backlight. Consequently, users' discomfort and anxiety about troubles can be prevented from being caused.

An OCB mode liquid crystal display apparatus in which the display is performed after carrying out the transition of the liquid crystal molecules in a liquid crystal layer from spray alignment to bend alignment is described in the present embodiment, as one example. The present invention is applied to other type liquid crystal display apparatuses, such as an FLC type liquid crystal display apparatus and a phase-transition type liquid crystal display apparatus, in which the display is performed after a transition from an initial state to a displayable state so that the state is non-uniformly shifted on a surface of a panel during the change.

The transition can be induced by providing a projection at an electrode or providing on a liquid crystal alignment layer a specific area such that a pretilt angle of a liquid crystal molecule thereon is different from that of a liquid crystal molecule on another area, resulting in the completion of transforming within a predetermined time.

Then, a higher voltage, such as approximately 25 V, than driving-signals for displaying is applied between electrodes as the voltage pulse for the transition. The application of so high voltage, however, requires great power consumption in transforming. When a voltage value of the voltage pulse for transition is approximately equal to the driving-signal for displaying of 5 to 6 V, the liquid crystal molecules in the liquid crystal layer were transformed from spray alignment to bend alignment under the low voltage despite approximately 30 seconds. That is, an electric power supply system for the transition does not always have to be provided separately from the system for displaying. Accordingly, the equalization of a voltage signal of the voltage pulse for transition to that of the driving signal for displaying decreases the power consumption and reduces the costs of the apparatus.

Figure 4:
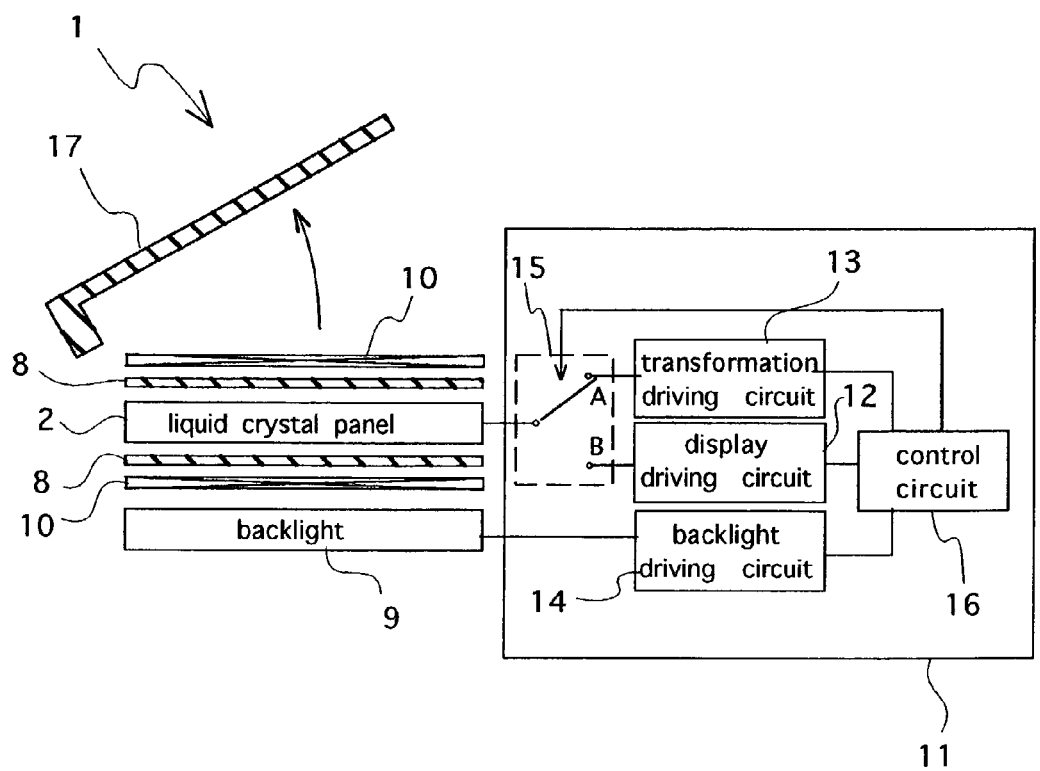
FIG. 4 is a schematic view showing a structure of liquid crystal display apparatus in another embodiment of the present invention.

In a case of liquid crystal display apparatus which has a cover 17 of the liquid crystal panel 2 to be opened for use such as a notebook type personal computer, a mobile computer and a folding portable phone as shown in FIG. 4, the control circuit 16 can also connect the liquid crystal panel 2 with the transition-driving circuit 13 or the display-driving circuit 12, being synchronized with the open and dose of the cover 17.

When the cover 17 is opened with the main power on, the control circuit 16 judges whether to apply the voltage pulse for transition to the liquid crystal panel 2 or not.

If the control circuit 16 determines to apply the voltage pulse for transition, the control circuit 16 operates the switch 15 to connect the liquid crystal panel 2 with the transition-driving circuit 13 and the voltage pulse for transition is applied to the liquid crystal panel 2 for 1 second, for example. After applying the voltage pulse for transition, the control circuit 16 operates the switch 15 to connect the liquid crystal panel 2 with the display-driving circuit 12 and the backlight 9 is turned on, being synchronized with the connection. As a result, the apparatus is shifted to an ordinary display-driving mode.

Meanwhile, if the control circuit 16 judges not to apply the voltage pulse for transition, the control circuit 16 operates the switch 15 to connect the liquid crystal panel 2 with the display-driving circuit 12 and the backlight 9 is turned on, being synchronized with the connection. As a result, the apparatus is shifted to an ordinary display-driving mode.

When the cover 17 is dosed with the main power on, the control circuit 16 operates the switch 15 to connect the liquid crystal panel 2 with the transition-driving circuit 13 and thereafter apply the voltage pulse for transition to the liquid crystal panel 2 in order to maintain the bend alignment. In addition, the control circuit 16 switches off the backlight 9, being synchronized with the application.

When an input from the user is not recognized for a predetermined time, the control circuit 16 similarly operates the switch 15 to connect the liquid crystal panel 2 with the transition-driving circuit 13 and the voltage pulse for transition is applied to the liquid crystal panel 2 in order to maintain the bend alignment. In addition, the control circuit 16 switches off the backlight 9, being synchronized with the application.

When an input from the user is recognized, the control circuit 16 operates the switch 15 to connect the liquid crystal panel 2 with the display-driving circuit 12 and thereafter switch on the backlight 9, being synchronized with the connection. As a result, the apparatus is shifted to an ordinary display-driving mode.

These operations of the control circuit 16 are useful for the driving of a notebook type personal computer, a mobile computer, a folding portable phone and the like.

In liquid crystal display apparatuses having a speaker such as liquid crystal televisions, the speaker is employed as a means of notifying the progress or completion of the transition.

When a main power of the liquid crystal display apparatus is switched on, the voltage pulse for transition is applied for a predetermined time (2 seconds, for example). For example, aural signal for notifying the progress of the transition is output from the speaker during the transition driving. That is, since the aural signal is output from the speaker before the transition is completed and the backlight is switched on, the user can be relieved during the transition-driving to recognize that the apparatus is starting up. In liquid crystal televisions, an output of a voice for broadcasting from a speaker is started at the moment with a main power switched on, and a voice signal for notifying a progressional state of the transition is superposed on a voice signal for broadcasting. If image display and voice output are started after the transition, the time lag from switching on to the start of image display and voice output can be a cause of users' anxiety. It, therefore, is desirable to prevent such users' anxiety by starting voice output previous to image display after switching on. When the transition driving is completed, the backlight is switched on and the apparatus is shifted to a display-driving mode, then the aural signal for notifying the completion of the transition is output from the speaker. Needless to say, the aural signal may be output after switching on the backlight.

A small-sized lamp, a light-emitting diode, an EL element and the like may be switched on as a sign for notifying the progress or completion of the transition to the user until the backlight is switched on, and after the transition is completed, the backlight may be switched on. Thus, the user can be relieved from anxiety about troubles.

Instead of predetermining the time for completing the transition in the transition-driving circuit, there may be provided a means of visually observing the liquid crystal panel and judging the completion of the transition to bend alignment although the constitution becomes complicated.

It is described above that the backlight is switched on after the transition driving is completed. Furthermore, the backlight does not always have to be switched on immediately after the transition-driving is completed, and the backlight may be switched on only while the liquid crystal panel is in the display-driving mode.

A transmission-type liquid crystal display apparatus is described in the present invention. In addition, a constitution of substituting a frontlight for the backlight makes no troubles for driving a reflection type liquid crystal display apparatus.

Embodiment 3

A liquid crystal display apparatus, which can complete the above-mentioned transition more certainly in a short time to be shifted to the display-driving mode, is described in this embodiment.

Figure 5:
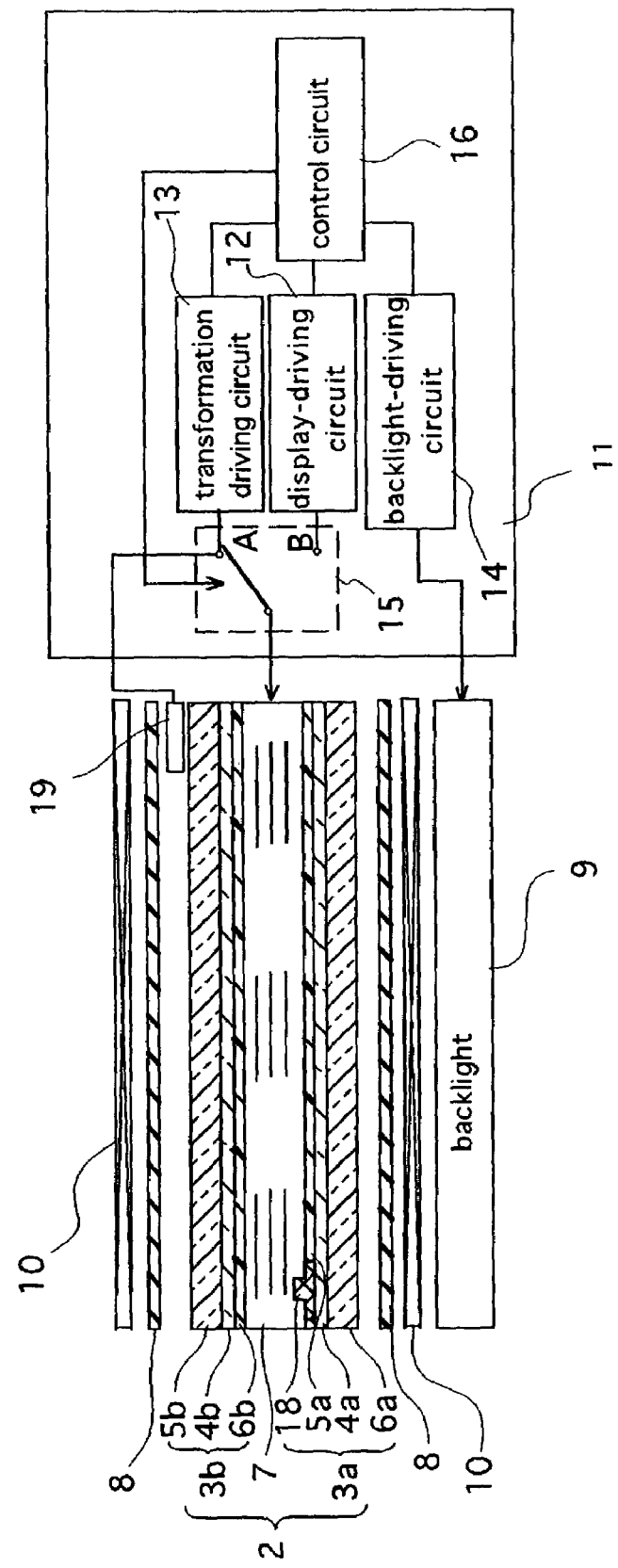
FIG. 5 is a schematic view showing a structure of liquid crystal display apparatus in still another embodiment of the present invention.

A schematic constitution of a liquid crystal display apparatus in this embodiment is shown in FIG. 5. The liquid crystal display apparatus has an active matrix type liquid crystal panel 2 in which a switching element is provided at each pixel, a pair of polarizers 10 and a phase-compensation plate 8 for optically compensating. The liquid crystal panel 2 includes a pair of opposite substrates 3a and 3b. The array substrate 3a is provided with a pixel electrode 4a and the switching element 18 made from TFT or the like. The counter substrate 3b is provided with a counter electrode 4b. Surfaces of the pixel electrode 4a and the counter electrode 4b are coated with liquid crystal alignment layers 6a and 6b, respectively. A polyamic acid type polyimide material for alignment layers (SE-7492, available from NISSAN CHEMICAL INDUSTRIES, LTD.) is applied by printing, burned and treated with rubbing to form both of the liquid crystal alignment layers 6a and 6b. The liquid crystal layer 7 is filled with a nematic liquid crystal material having a positive dielectric anisotropy to be provided with a spacer of approximately 5 μm in diameter for maintaining a certain gap between the substrates (not shown). Under no application of voltage the liquid crystal alignment layers 6a and 6b are disposed with parallel rubbing directions so that liquid crystal molecules on each surface thereof offer a pretilt angle of approximately 5 to 6° to form spray alignment such as to be inclined symmetrically and outwardly with the molecular axes on a plane.

Figure 6:
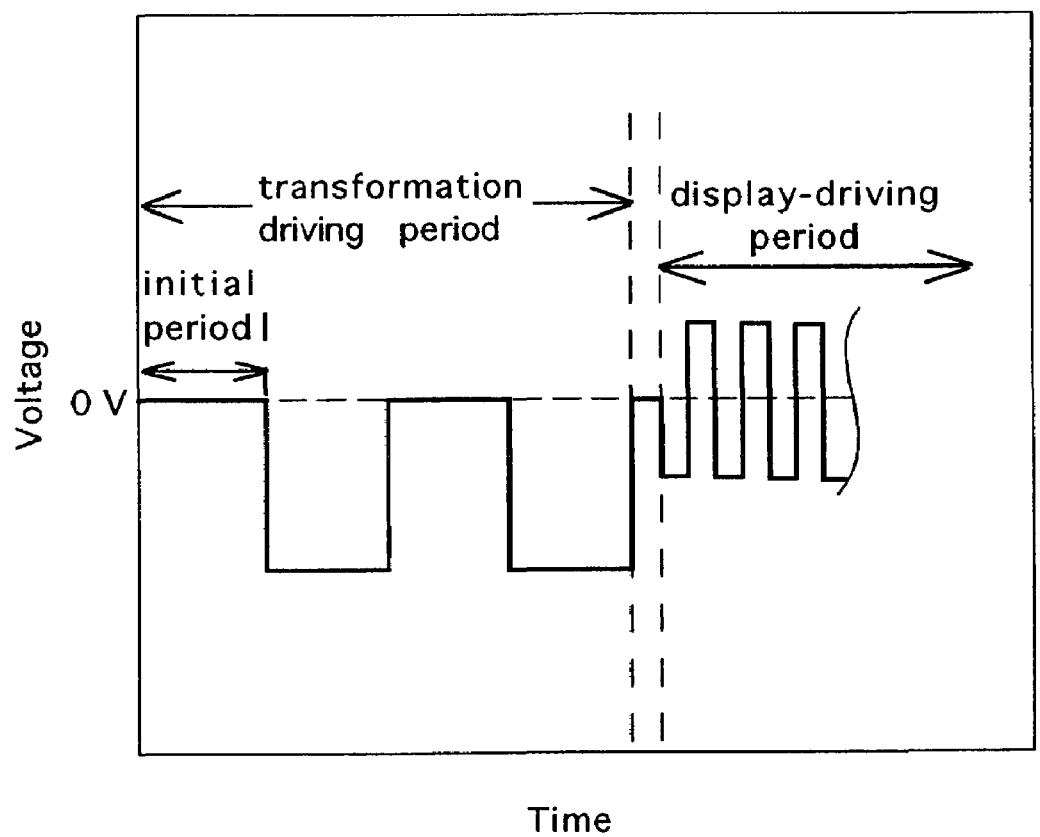
FIG. 6 is a characteristic diagram showing a waveform of voltage pulse for a transition applied to a liquid crystal layer in the same embodiment.

A temperature sensor 19 disposed close to the liquid crystal panel 2 detects a temperature of the liquid crystal panel 2 to output temperature sensing signal to the transition-driving circuit 13. When it is difficult to dispose the temperature sensor 19 dose to the liquid crystal panel 2, the temperature sensor 19 is disposed near the liquid crystal panel 2. That is, the surrounding temperature may be substituted for a temperature of the liquid crystal panel 2. The transition-driving circuit 13 determines the conditions of the voltage pulse for transition applied between the pixel electrode 4a and the counter electrode 4b of the liquid crystal panel 2 on the basis of the temperature-sensing signal. The transition-driving circuit 13 applies the voltage pulse for transition having a duty cycle of 50% as shown in FIG. 6 between the pixel electrode 4a and the counter electrode 4b.

An initial period in which an initial voltage between both of the electrodes is approximately 0 V(0±0.5 V is set immediately after the transition driving is started. The voltage in a voltage pulse interval period is also set to be approximately 0 V(0±0.5 V) similarly to the initial voltage.

In the same liquid crystal display apparatus as a liquid crystal display apparatus in this embodiment, the transition time for completing to transform all pixels in display area of the liquid crystal panel was evaluated on the following conditions: a temperature of −10° C., 0° C., 20° C., 40° C. or 60° C.; regarding a voltage pulse for transition with a voltage value of −15 V, −20 V or −30 V, and a frequency of 0.5 Hz, 1 Hz, 3 Hz or 5 Hz.

These results are shown in the following Tables 2 to 4.

TABLE 2

|  | 0.5 Hz | 1 Hz | 3 Hz | 5 Hz |
| --- | --- | --- | --- | --- |
| −10° C. | 6 sec | 18 sec | — | — |
| 0° C. | 6 sec | 10 sec | 18 sec | 30 sec |
| 20° C. | 4 sec | 4 sec | 2.7 sec | 3.5 sec |
| 40° C. | 4 sec | 2 sec | 1 sec | 1.7 sec |
| 60° C. | 2 sec | 2 sec | 0.6 sec | 1.3 sec |
|  |  |  | at voltage value of −15 V | |

TABLE 3

|  | 0.5 Hz | 1 Hz | 3 Hz | 5 Hz |
| --- | --- | --- | --- | --- |
| −10° C. | 4 sec | 8 sec | 38 sec | — |
| 0° C. | 2 sec | 3 sec | 6 sec | 12 sec |
| 20° C. | 2 sec | 1 sec | 0.6 sec | 0.8 sec |
| 40° C. | 2 sec | 1 sec | 0.6 sec | 0.6 sec |
| 60° C. | 2 sec | 1 sec | 0.3 sec | 0.4 sec |
|  |  |  | at voltage value of −20 V | |

TABLE 4

|  | 0.5 Hz | 1 Hz | 3 Hz | 5 Hz |
| --- | --- | --- | --- | --- |
| −10° C. | 2 sec | 4 sec | 24 sec | 40 sec |
| 0° C. | 2 sec | 2 sec | 4 sec | 8 sec |
| 20° C. | 2 sec | 1 sec | 0.6 sec | 0.6 sec |
| 40° C. | 2 sec | 1 sec | 0.3 sec | 0.4 sec |
| 60° C. | 2 sec | 1 sec | 0.3 sec | 0.4 sec |
|  |  |  | at voltage value of −30 V | |

The liquid crystal display apparatus in the present embodiment is described below on the basis of the resulting dependence of the transition time on temperature.

Embodiment 3.1 Variation of Frequency

The transition-driving circuit 13 determines a frequency of the voltage pulse for transition applied between the electrodes of the liquid crystal panel 2 on the basis of a temperature of the liquid crystal panel 2 (or the surrounding temperature) detected with the temperature sensor 19 and the following Table 5.

TABLE 5

| Temperature (° C.) | Frequency (Hz) | Transition Time (sec) |
| --- | --- | --- |
| −10 | 0.5 | 2 |
| 0 | 1 | 2 |
| 20 | 3 | 0.6 |
| 40 | 3 | 0.3 |
| 60 | 3 | 0.3 | at voltage value of −30 V

The frequency of the voltage pulse for transition is continuously varied lower with a lower temperature of the panel. Thus, the transition to bend alignment can be completed within 2 seconds at the longest.

Actually, when the voltage pulse for transition was applied between the pixel electrode 4a and the counter electrode 4b in a temperature range of −10 to 60° C., the transition to bend alignment was completed in a shorter time than 1 second at a frequency of several cycles in a temperature range of 20 to 60° C., while the transition to bend alignment was completed in 2 seconds at a low frequency of 1 Hz or less in a temperature range of −10 to 0° C.

That is to say, a temperature of the liquid crystal panel 2 is detected so that a frequency of the voltage pulse for transition is determined on the basis of the detected temperature, leading to the completion of the transition to bend alignment in a shorter time than 1 second in a wide range of room temperature to high temperature, while in as short a time as 2 seconds at a low temperature of 0° C. or less.

In a conventional OCB mode liquid crystal display apparatus employing the voltage pulse having a fixed frequency of several cycles in the whole operable temperature range, it takes to complete the transition to bend alignment 1 second or less at high temperature while several to tens of seconds at low temperature. The transition, however, can be completed in an extremely short time in a range from low temperature to high temperature, resulting in a faster shift to the display-driving mode.

Depending on used liquid crystal materials and a structure of a liquid crystal panel generally the transition can be completed in 1 second or less at a frequency of 2 to 5 Hz, desirably 2 to 4 Hz, in a high temperature range of 20 to 60° C., while in approximately 2 seconds at a low frequency of 0.2 to 1 Hz, desirably 0.4 to 0.6 Hz, in a low temperature range of −10 to 0° C. Needless to say, a voltage value of the voltage pulse does not have to be set −30 V but the voltage pulse having a different voltage value may be applied depending on the constitution of a liquid crystal panel such as used materials and cell gap.

In order to complete the transition in a short time, it is effective to set in advance of applying the voltage pulse an initial period such that a voltage between both of the electrodes is ideally 0 V, but substantially 0±0.5 V. It is also effective that a voltage between the electrodes in an interval between the repeated voltage pulses is set to be 0±0.5 V, preferably 0 V. The effect is particularly exhibited at low temperature. The reason for setting is as follows: if electric potential differs by approximately −1 V between both of the electrodes immediately before the transition driving is started and in a voltage pulse interval period, the liquid crystal molecule remains a stable nonuniform spray alignment due to the potential difference; therefore an occurrence ratio of the transition core (that is, a micro area transformed to bend alignment) is remarkably decreased in applying the voltage pulse, leading to requiring more repetition of the voltage pulse as compared with the case of setting a period such that a voltage between both of the electrodes is approximately 0 V. For such reason, it is preferable to sufficiently set the initial period and the voltage pulse interval period.

For example, the initial period is set to be 1 second for the voltage pulse having a duty cycle of 50% and a frequency of 0.5 Hz, the initial period is set to be 0.5 second for the voltage pulse having a duty cycle of 50% and a frequency of 1 Hz, and the initial period is set to be 0.16 second for the voltage pulse having a duty cycle of 50% and a frequency of 3 Hz. An practical initial period varies approximately from 0.2 to 2 seconds with liquid crystal materials and the constitution of a liquid crystal panel; however it is more effective in stably progressing the transition to prolong the initial period to approximately 2 to 5 seconds. In this case, the initial period after staling the transition can be shortened by maintaining a voltage of 0 V between the electrodes in advance of starting the transition, for example, during switching off a main power of the apparatus.

Embodiment 3.2 Variation of Voltage Value

Similarly, the transition in a short time is made possible by varying a voltage value of the voltage pulse for transition in accordance with a temperature of the liquid crystal panel 2.

As shown in the following Table 6, the transition-driving circuit 13 determines a voltage value of the voltage pulse for transition applied between the electrodes on condition that a frequency of the voltage pulse is set to be 0.5 Hz on the basis of the signal from the temperature sensor 19, namely, a temperature of the panel. That is, a voltage value of the voltage pulse for transition continuously is varied lower with a lower temperature of the panel.

TABLE 6

| Temperature (° C.) | Voltage Value (V) | Transition Time (sec) |
| --- | --- | --- |
| −10 | −30 | 2 |
| 0 | −20 | 2 |
| 20 | −20 | 2 |
| 40 | −20 | 2 |
| 60 | −15 | 2 | at frequency of 0.5 Hz

Actually, when the voltage pulse for transition was applied between both of the electrodes under the conditions of the above Table 6, the transition was completed by applying sole of the voltage pulse for transition, namely, in 2 seconds in the whole temperature range; the application of a voltage value of −20 V or more in a temperature range of 20 to 60° C., while the application of a voltage value of −20 V or less in a temperature range of −10 to 20° C.

That is to say, as described above, a temperature of the panel is detected so that the voltage pulse for transition having a voltage value determined according to the detected temperature is applied, leading to the completion of the transition to bend alignment in as short a time as 2 seconds in a wide range from low temperature to high temperature, in other words a shift to the display-driving mode in an extremely short time even at low temperature.

A voltage value and a frequency of the voltage pulse are determined depending on used liquid crystal materials, the constitution of a cell and the like.

In this embodiment, a frequency of the voltage pulse for transition is set to be 0.5 Hz and for practical use the initial period is set to be 1 second immediately after the transition driving is started. However, it is effective to set the initial period to be approximately 0.2 to 5 seconds. An initial period varies approximately from 0.2 second to 5 seconds with the materials and the temperature. The initial period may be set in advance of staring the transition. In this case, a substantially sufficient initial period can be set before starting the transition, leading to a short initial period to be set after starting the transition. The initial voltage is set to be ideally 0 V, but 0±approximately 0.5 V.

Embodiment 3.3 Variation of Frequency and Voltage Value

The transition can be completed in a short time in a range from low temperature to high temperature also by varying both a frequency and a voltage value of the voltage pulse for transition in accordance with the surrounding temperature. For example, both of the frequency and the voltage value are determined as shown in the following Table 7.

TABLE 7

| Temperature (° C.) | Frequency (Hz) | Voltage Value (V) | Transition Time (sec) |
|---|---|---|---|
| −10 | 0.5 | −30 | 2 |
| 0 | 0.5 | −20 | 2 |
| 20 | 1 | −20 | 1 |
| 40 | 3 | −15 | 1 |
| 60 | 3 | −15 | 0.6 |

The transition time varies greatly with a duty cycle of the voltage pulse or pulsewidth. The duty cycle for the shortest transition time varies in accordance with a temperature of the panel. Consequently, the transition time can be shortened also by varying a pulsewidth instead of the above-mentioned frequency and voltage value in accordance with the temperature.

As described above, when the conditions such as the frequency and the voltage value are continuously varied in accordance with a temperature of the panel, the most appropriate conditions of the voltage pulse can be obtained, however, resulting in the complicated constitution of the transition-driving circuit. For example, therefore, as shown in the following Table 8, a range of temperatures for assuring the operation is divided into two portions so that the conditions of the voltage pulse for transition are set for each of the divided range of temperatures, leading to the simplified constitution of the transition-driving circuit although the transition time at low temperature is somewhat prolonged.

TABLE 8

| Temperature Range (° C.) | Frequency (Hz) | Voltage Value (V) | Transition Time (sec) |
|---|---|---|---|
| −10 ≤ T < 10 | 0.5 | −30 | 2 |
| 10 ≤ T ≤ 60 | 3 | −20 | 0.3–1 |

Needless to say, a range of temperatures for assuming the operation may be divided into three portions or more.

As described above, the transition time can be shortened in a wide temperature range by applying the voltage pulse for transition having a frequency, a voltage value, a pulsewidth or two or more of them determined in accordance with a temperature of the panel.

Embodiment 3.4 Fixation at the Lowest Operable Temperature

Methods for determining the conditions of the voltage pulse for transition in accordance with a temperature of the panel was described in the above-mentioned embodiments, while a method for driving in which the transition time can be shortened even at low temperature with more simplified constitution is described in this embodiment.

It takes more time to complete the transition at low temperature than at high temperature. The transition, therefore, was completed in 2 seconds at least in a wide temperature range of −10 to 60° C. by applying between both of the electrodes the voltage pulse for transition under the conditions of completing the transition in as short a time as 2 seconds at the lowest operable temperature of −10° C., in other words a frequency of 0.5 Hz and a voltage value of −30 V.

In the above-mentioned embodiments, the transition was completed by applying 1 pulse of the negative voltage pulse for transition, namely, in 2 seconds on condition that a frequency of the voltage pulse is set to be 0.5 Hz. An appropriate frequency varies with liquid crystal materials and the constitution of a liquid crystal panel. Generally, the transition can be completed in a shorter time by selecting a frequency from a range of 0.2 to 1 Hz, desirably 0.4 to 0.6 Hz. 1 pulse or more of the voltage pulse for transition should be applied depending on the conditions.

Although the lowest operable temperature was set to be −10° C. in the above-mentioned embodiments, the lowest operable temperature varies with the constitution of the apparatus.

The invention claimed is:

1. A method for driving a liquid crystal display apparatus having a liquid crystal panel, said apparatus comprising:
    a pair of substrates;
    a liquid crystal layer sandwiched between said pair of substrates; and
    a voltage-application unit for applying a voltage to said liquid crystal layer, wherein an initial alignment of said liquid crystal layer is different from a displayable alignment, the method comprising:
    applying a voltage to said liquid crystal layer for transitioning a display area in said liquid crystal layer from the initial alignment to the displayable alignment before displaying an image in the liquid crystal panel; and
    stopping the application of voltage when the transition from the initial alignment of the display area to the displayable alignment is completed.

2. The method of claim 1, wherein the size of the display area of said liquid crystal panel is M×N (M≧N), said transition is completed after a value of a product of a linear growth rate of said liquid crystal layer transformed to said displayable alignment and a time for applying said voltage for transition is greater than a value of M.

3. The method of claim 1, wherein the size of the display area of said liquid crystal panel is M×N (M≧N), said transition is completed after a value of a product of a linear growth rate of said liquid crystal layer transitioned to said displayable alignment and a time for applying said voltage for transition reaches a predetermined value in a range of 1 to 2 times the value of M.

4. The method of claim 2, said method further comprising:
measuring a temperature of said liquid crystal panel prior to applying said voltage; and
setting a time for applying said voltage on the basis of said temperature.

5. The method of claim 2, said method further comprising setting a time for applying said voltage based on a predetermined lowest temperature within an operable temperature range for transitioning an area of said liquid crystal layer to said displayable alignment.

6. The method of claim 1, wherein said display panel comprises a plurality of pixels, and said method further comprising generating a transition in the liquid crystal layer at each pixel during the transition to the displayable alignment.

7. The method of claim 6, wherein the size of said pixel is represented by M×N (M≧N), said transition is completed after a value of a product of a linear growth rate of said liquid crystal layer transitioned to said displayable alignment and a time for applying said voltage for transition is greater than a value of M.

8. The method of claim 1, wherein said display panel has a plurality of areas comprising a predetermined number of pixels, and said method further comprising generating a transition core in the liquid crystal layer at each area during the transition to the displayable alignment.

9. The method of claim 8, wherein the size of the display area of said liquid crystal panel is represented by M×N (M≧N), said transition is determined to be completed after a value of a product of a number of the formed transition cores, a linear growth rate of said transition cores and a time for applying said voltage for said transition becomes greater than a value of M.

10. The method of claim 2, wherein said voltage is applied intermittently to said liquid crystal layer.

11. The method of claim 2, wherein said voltage is applied continuously to said liquid crystal layer.

12. The method of claim 2, said apparatus further comprising a backlight, said method further comprising switching said backlight on after stopping the application of said voltage.

13. The method of claim 2, wherein said displayable alignment is a bend alignment and said initial alignment is a spray alignment.

* * * * *

UNITED STATES PATENT AND TRADEMARK OFFICE
CERTIFICATE OF CORRECTION

PATENT NO. : 7,202,849 B2  Page 1 of 1
APPLICATION NO. : 10/247713
DATED : April 10, 2007
INVENTOR(S) : Katsuji Hattori et al.

It is certified that error appears in the above-identified patent and that said Letters Patent is hereby corrected as shown below:

ON THE TITLE PAGE:

Item (30) Foreign Application Priority Data, the second line should read:

--Feb. 10, 2000   (JP) ................. 2000-032908--.

Item (57) Abstract line 11, "sift" should read --shift--.

Signed and Sealed this

Seventh Day of August, 2007

JON W. DUDAS
*Director of the United States Patent and Trademark Office*